(12) United States Patent
Russo et al.

(10) Patent No.: US 7,986,585 B2
(45) Date of Patent: Jul. 26, 2011

(54) RECEPTION OF UPLINK DATA FROM SONOBUOYS

(75) Inventors: Donato M. Russo, Hollywood, MD (US); Ronald Buratti, Drayden, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 497 days.

(21) Appl. No.: 12/261,457

(22) Filed: Oct. 30, 2008

(65) Prior Publication Data

US 2010/0110828 A1    May 6, 2010

(51) Int. Cl.
*H04B 1/59* (2006.01)
(52) U.S. Cl. .......................................................... 367/3
(58) Field of Classification Search .................. 367/3, 5
See application file for complete search history.

(56) References Cited

U.S. PATENT DOCUMENTS 5,452,262 A * 9/1995 Hagerty ............................ 367/6
2009/0316522 A1 * 12/2009 Sato .................................. 367/5

* cited by examiner

*Primary Examiner* — Ian Lobo
(74) *Attorney, Agent, or Firm* — Mark D. Kelly; Mark O. Glut

(57) ABSTRACT

A method for improving the bit error rate in digital transmissions of sonobuoy sensor data from a sonobuoy to a receiver platform includes computing a send checksum on a frame of sonobuoy sensor data, copying the frame of data and checksum into a plurality of subframes, delaying one of the plurality of subframes for a predetermined period, multiplexing the delayed subframe with the plurality of subframes into a transmit frame; and transmitting the transmit frame. The invention is particularly suited to improving the reception of legacy sonobuoy receivers in littoral waters where radio frequency interference and signal propagation is a severe problem.

7 Claims, 4 Drawing Sheets

RECEPTION OF UPLINK DATA FROM SONOBUOYS

GOVERNMENT INTEREST

The invention described herein may be manufactured, licensed, and used by or for the U.S. Government.

TECHNICAL FIELD

The present invention relates generally to sonar systems and more particularly to a system and method for improved reception of uplink data from sonobuoys by sonobuoy receiving systems.

BACKGROUND

The United States Navy maintains a superior global Anti-Submarine Warfare (ASW) capability with the ability to detect, localize, identify, and track potentially hostile submarines. On a typical ASW mission, a number of expendable sonobuoys are deployed from an aircraft. The Sonobuoys generally provide both an acoustical signal source and a reception capability for underwater acoustic signals of interest. Parameters affecting acoustic signals, for example, depth, water temperature and salinity, may also be detected. This data is transmitted on uplink channels to monitoring units that process the signals for target analysis, classification, and recording for replay and post-event analysis. Established sonobuoy tactics allow for short and long range detection of surface ships and submarines resulting in the prosecution of identified hostile targets.

Presently a large number of ASW aircraft use sonobuoy receivers that have been in service for a number of years, for example, the AN/ARR-78 and modifications, as well as the ARR-78, ARR-84, ARR-78 v3. ARR-89, and modifications of those units (collectively referred to herein as "legacy sonobuoy receivers.") The legacy sonobuoy receivers contain twenty or four receiver modules, depending on the model, each capable of accepting operating channels 1-99 (those sonobuoy channels now in use and those being developed for future use) in the VHF band from 136 to 173.5 megahertz (MHz). The receiver modules may be tuned to any one of the sonobuoy operating channels. The output from the legacy sonobuoy receivers is fed to a data demultiplexer which is implemented on a personal computer referred to as a Low-Cost Advanced Processor (LCAP) and which transforms the receiver frequency shift keyed (FSK) output to a digital stream that can be processed with a conventional computer. The LCAP output is passed to an AN/UYS-1 or AN/UYS-1A single advanced signal processor (SASP) system. The SASP system includes a spectrum analyzer and programmable signal processor that extracts and conditions acoustic sonobuoy data to determine frequency, amplitude, bearing, Doppler, range, and other characteristics for detection and tracking of underwater targets.

While the legacy sonobuoy receivers are highly reliable, they have certain inherent limitations that restrict the insertion of new technology. In particular, reception of FSK modulated digital transmissions from recently developed sonobuoys, for example, the AN/SSQ-101 and AN/SSQ-110 (referred to herein as "digital sonobuoys"), have presented new challenges. Although the legacy sonobuoy receivers are able to demodulate signals from the digital sonobuoys and can do so at the highest data rate of 256 kbps, they cannot perform any operations to reduce the bit error rate (BER). Systems that use digital sonobuoys require a BER of $10^{-5}$ (1 error in 100 Kbits), or better.

In traditional deep water ASW operations, radio frequency interference (RFI) is not usually significant and the BER requirements of the new sonobuoy systems can generally be achieved with existing transmission schemes and legacy sonobuoy receivers. However, in recent years, naval operations have increased in littoral waters where RFI from both land-based and small boat sources is much more problematic. When RFI occurs in a digital sonobuoy uplink channel that is being monitored by an aircraft, the data becomes unusable because of the increased BER caused by RFI and signal propagation problems. At present, forty-seven wideband sonobuoy channels are available for digital sonobuoys operating at 256 kbps. Frequently, RFI in littoral waters is so severe that only a small number of channels are available for use. Thus, the aircraft cannot complete its mission.

Although a number of methods exist to mitigate RFI, including, for example, narrowband filtering, and spatial interference nulling, these techniques are not easily integrated with systems incorporating legacy sonobuoy receivers. Narrowband notch filtering could be provided by the addition of an external filter unit. However, a narrowband filter would be expensive, require installation space, add weight and power requirements to the aircraft and be difficult to interface properly with the legacy sonobuoy receivers. Likewise, spatial filtering would require one or more additional external antennas to be added to the aircraft as well as an external device and interface for the receiver which would also require installation space and add weight and power requirements to the aircraft. While RFI might also be reduced by transmitting more power, this option is impractical because it would add weight, size and power requirements to the sonobuoys. Error control coding (ECC) is also impractical because it can not be implemented using legacy sonobuoy receivers within the constraints of existing channel capacity.

What is needed is a practical, reliable, and inexpensive way to improve the BER of systems incorporating legacy sonobuoy receivers so that data fidelity requirements of newly developed digital sonobuoys can be met under a wide variety of operating conditions. Embodiments according to the present invention are directed to solving this need.

SUMMARY

In general, in one aspect, an embodiment of a method for improving the bit error rate in digital transmissions of sonobuoy sensor data from a sonobuoy to a receiver platform, includes computing a send checksum on a frame of sonobuoy sensor data, copying the frame of data and checksum into a plurality of subframes, delaying one of the plurality of subframes for a predetermined period, multiplexing the delayed subframe with the plurality of subframes into a transmit frame; and transmitting the transmit frame. In another aspect, an embodiment of a method for improving the bit error rate in digital transmissions of sonobuoy sensor data from a sonobuoy to a receiver platform includes selecting the predetermined period to be longer than an expected duration of an ocean wave period. In another aspect, an embodiment of a method for improving the bit error rate in digital transmissions of sonobuoy sensor data from a sonobuoy to a receiver platform includes receiving the transmit frame at a legacy sonobuoy receiver, demultiplexing the transmit frame into a plurality of subframes, computing received checksums for the plurality of subframes, and comparing the received checksums with the send checksum to determine whether data in either or both subframes is corrupt.

BRIEF DESCRIPTION OF THE DRAWINGS

Embodiments according to the invention are illustrated in the accompanying drawings in which like reference numerals represent like parts throughout and in which.

DETAILED DESCRIPTION

In the following detailed description, reference is made to the accompanying drawings which are a part of this patent disclosure, and in which are shown by way of illustration specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art.

In order to address the BER problem for legacy sonobuoy receiver systems it is important to understand the causes that contribute to RFI and signal propagation problems in such systems. Under realistic at-sea conditions in littoral waters the required BER is often not realized because of various factors, including wave washover, multipath, and RFI from overmodulated or mistuned marine communications and/or land-based signal sources.

Embodiments according to the present invention employ a redundant data transmission (RDT) technique to overcome RFI and signal propagation problems with a minimum of complexity and in a system that is transparent to legacy sonobuoy receiver systems. Essentially, in one example, RDT reduces sonobuoy communication channel errors by transmitting the sensor data twice with a selected time delay between the two transmissions. The time delay is predetermined to be just long enough to exceed the expected duration of the RFI and/or the ocean wave period.

Figure 1:
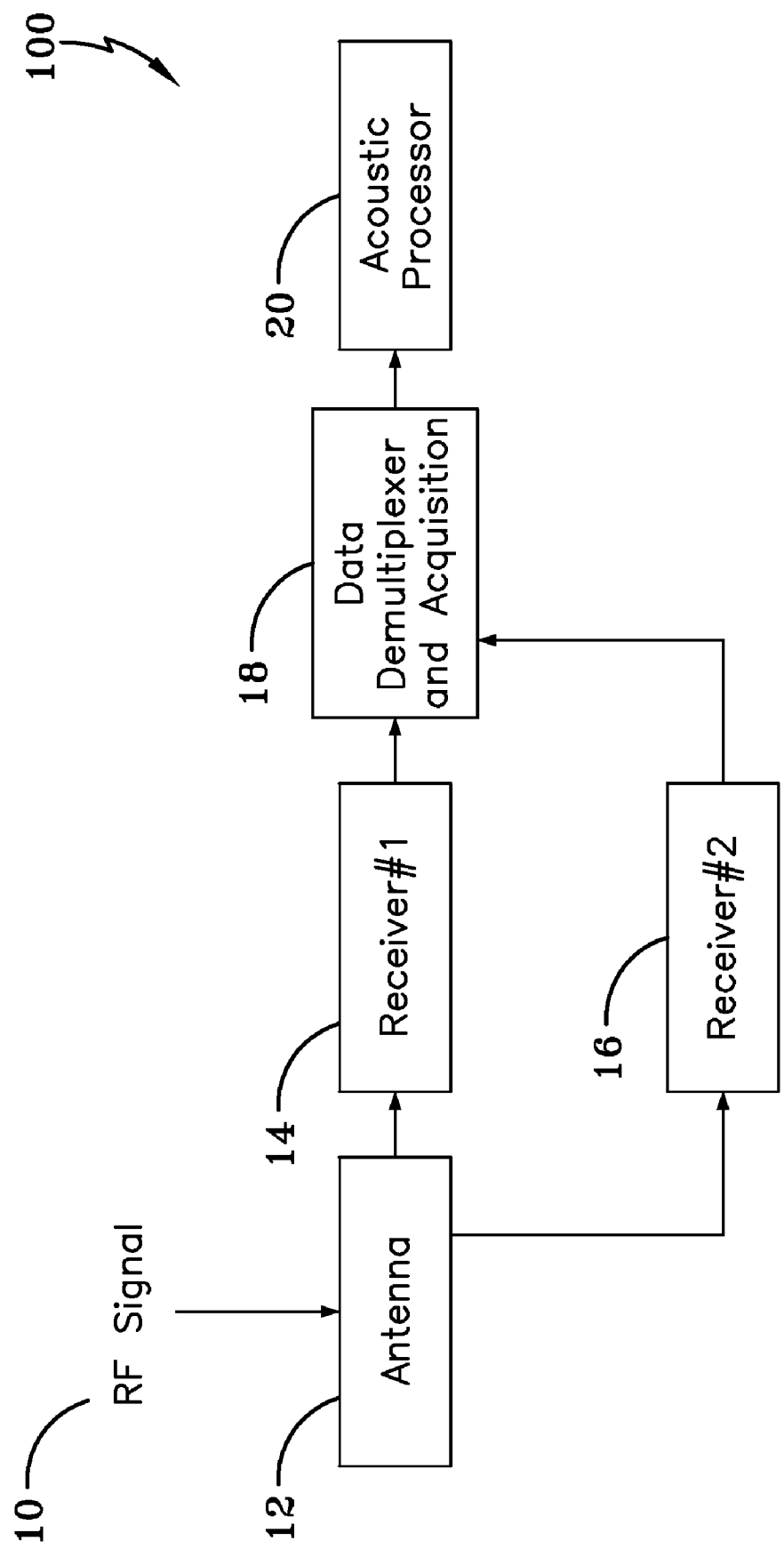
FIG. 1 is a block diagram showing relevant functional components of a representative ASW acoustic sonobuoy receiver system for use in connection with the present invention.

FIG. 1 is a high level block diagram showing the major functional components of an ASW acoustic sonobuoy receiver system 100 in an embodiment according to the present invention. An RF signal 10 from a digital sonobuoy (not illustrated) is received by an antenna 12 and split between two legacy sonobuoy receivers 14 and 16 where it is demodulated. The demodulated data output from legacy sonobuoy receivers 14 and 16 is provided to a data demultiplexer and acquisition stage 18 which formats the data for an acoustic processor 20, stores it for replay, and outputs the data to the acoustic processor 20 implemented on the SASP. In this embodiment, the data de-multiplexer is implemented on the aforementioned LCAP which includes a specially designed sonobuoy data acquisition (DAQ) card (not separately illustrated). The LCAP computer hardware may be based, for example, on dual Intel® Pentium® Xeon® processors clocked at 3.06 Giga Hz. In alternative embodiments, other personal computer systems and components that have similar capabilities could likewise be employed.

The DAQ device employed in this embodiment is built to a single slot PCI form factor. The DAQ performs the function of input signal conditioner for all digital sonobuoy uplink types in the LCAP. The primary function of the DAQ is to transform a digital bipolar voltage signal from the radio receiver into a digital data stream that can be processed with a computer. The DAQ outputs the digitized data to the PC over a Universal Serial Bus (USB). The PC receives the digital data from the DAQ and performs the RDT processing. In this embodiment, the RDT algorithm is implemented as a "C" language computer program that runs on the LCAP PC. The RDT Processing runs in real-time on the dual Pentium® Processors.

To simplify this discussion, data received by sonobuoy receiver system 100 is treated as having no "overhead," i.e., no Barker codes, headers, etc. However, it is to be understood that transmitted data typically includes overhead for synchronization and formatting. Using empirical observations, the statistical distribution of data dropouts was measured. Using these distributions, it was determined that approximately a 1.6 sec. delay would be sufficient to guarantee that most (but not all) of the dropouts could be repaired by providing an appropriately delayed second transmission of the data sample. The delay represents a compromise between performance and storage capacity available in the sonobuoy.

The RDT concept in embodiments according to the present invention depends on the expectation that one of the two redundant data sets will have data that is correct. In order to determine whether a data set is correct, an absolute reference is generated in the sonobuoy prior to transmission to the aircraft. A technique is needed to provide information to determine which of the data samples may be corrupted and to transmit this information to the aircraft while retaining compatibility with the legacy sonobuoy receivers and at the same time fitting concurrently into the standard data communications format. The method that was developed is called a sensor check sum (SCS). The SCS involves computing a value based on the data for each sample and appending that value or checksum to the data transmitted to the aircraft. Upon receipt of the data in the aircraft, a receive checksum (RCS) is computed for each data sample sent by the sonobuoy. The data samples in which the RCS is equal to the SCS are assumed correct. This processing is performed in data demultiplexer and acquisition stage 18 of ASW acoustic sonobuoy receiver system 100.

Figure 2:
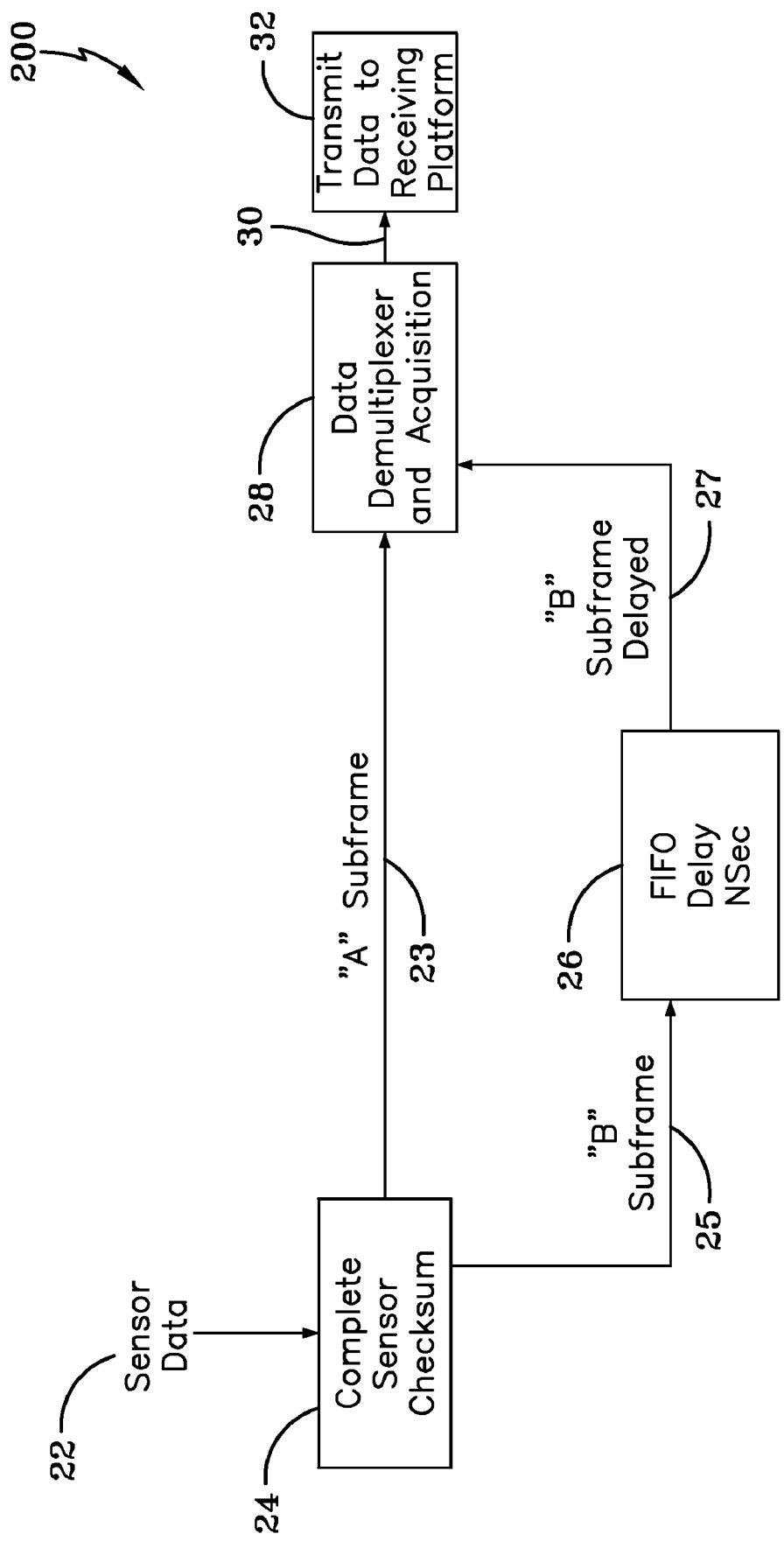
FIG. 2 is a functional block diagram illustrating redundant transmission of data as implemented in a representative sonobuoy transmitter in an embodiment according to the present invention.

FIG. 2 is a block diagram illustrating how RDT data is processed in an embodiment according to the present invention on a representative sonobuoy sensor system 200. In this example, the invention has been embodied in a Digital Vertical Line Array (DVLA) sonobuoy. The DVLA is equipped with an in-buoy processor, an Analog Devices 2188 Digital Signal Processor, a single-chip microcomputer optimized for digital signal processing (DSP) and other high-speed numeric processing applications and which includes on chip program and data memory. Advantageously, the RDT algorithm may be implemented in the DVLA Sonobuoy (and similarly equipped units) without modifying the hardware. A frame of sensor data 22, which includes sensor data from a number of acoustic elements, is provided to block 24 which calculates a checksum on the frame. The checksum consists of the modulo 2 summation over all sensor values in the frame. Typically, for the sonobuoys of interest (i.e., DVLA, MOD, Air Deployable Active Receiver (ADAR), and similar units) there are 50 14 bit sensor values in the frame of sensor data 22. The checksum is modulo $2^{16}$, i.e., 16 bits. While the checksum could be truncated in some embodiments, in this example it is not. The send checksum (SCS) is multiplexed with the frame of sensor data 22, preferably at the end of the frame, for transmission to ASW acoustic sonobuoy receiver system 100. Following calculation of the checksum, the frame of sensor data 22 is split into identical subframes, an "A" subframe 23 and a "B" subframe 25. B subframe 25 is passed to an N-depth first-in-first-out (FIFO) buffer 26 which delays it by N frames to achieve a delay of about 1.6 seconds, and outputs a delayed B subframe 27. Delayed B subframe 27 and A subframe 23 are then multiplexed in multiplexer block 28 into a transmit frame 30 which is provided to a transmitter stage 32 of sonobuoy sensor system 200 for RF transmission to ASW acoustic sonobuoy receiver system 100.

Figure 3:
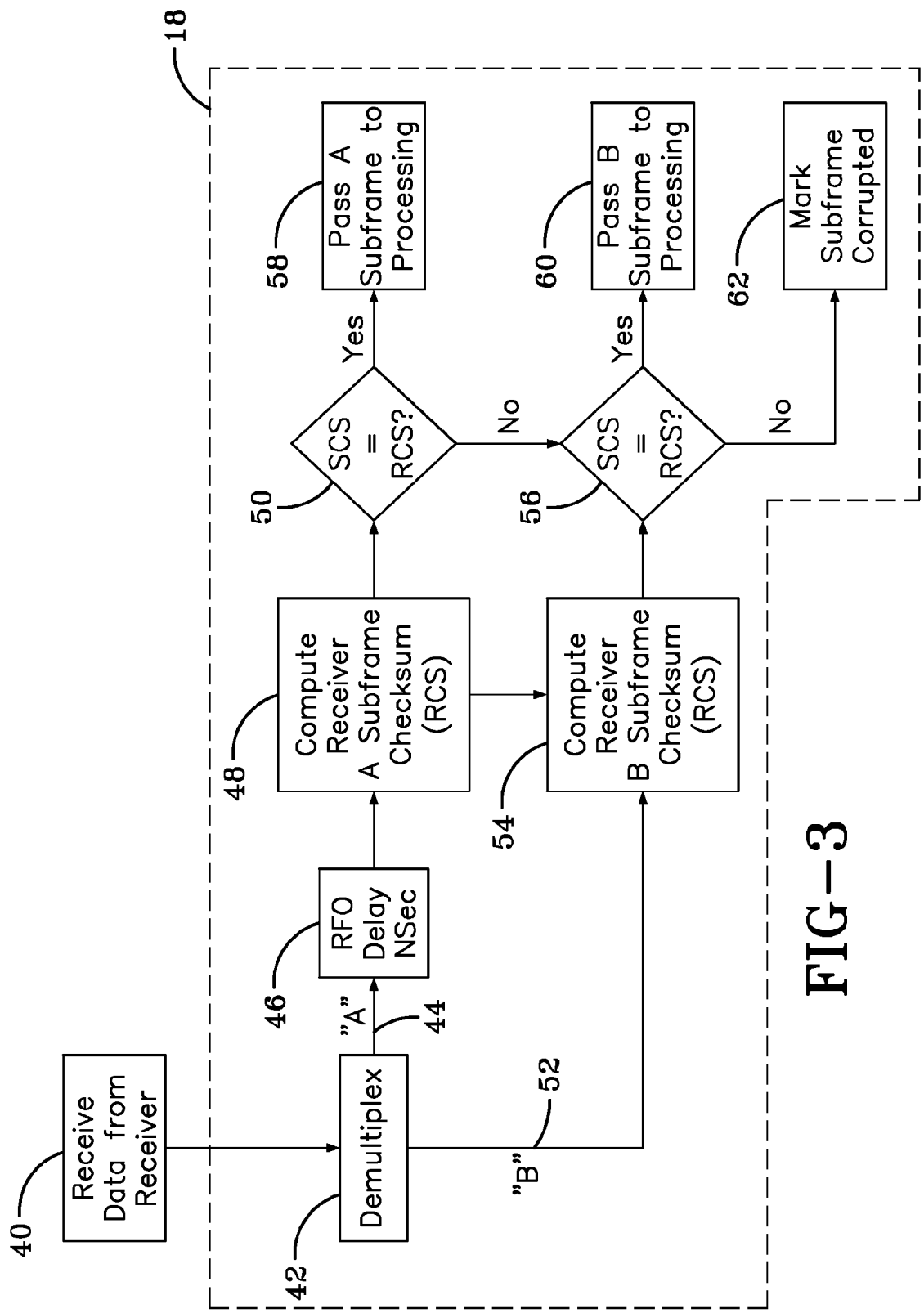
FIG. 3 is a functional block diagram illustrating RDT processing of data as implemented in a representative ASW acoustic sonobuoy receiver system in an embodiment according to the present invention.

An embodiment of receiver RDT processing according to the present invention is shown in FIG. 3. The signals transmitted from sonobuoy sensor system 200 are received by an ASW acoustic sonobuoy receiver system 100. A receiver output frame 40 from a legacy sonobuoy receiver (not illustrated in FIG. 3) is demultiplexed in block 42 into an A subframe 44 and B subframe 52. A subframe 44 is delayed by an N length FIFO in block 46 to align it in time with B subframe 52. The FIFO in block 46 is implemented in software but may be implemented in hardware in alternative embodiments. A receive checksum (RCS) is computed on the A and B subframes in checksum blocks 48 and 54, respectively. The RCS's and SCS's are compared for the A and B subframes, respectively, in decision blocks 50 and 52. If the A subframe RCS matches the A subframe SCS the A subframe is considered correct and may be passed on for processing. If, however, the A subframe RCS does not match the A subframe CSC, but the RCS and CSC of the B subframe do match, then the B subframe is passed on for processing. If neither the A nor the B checksums match the sensor checksums, the frame is marked corrupt and the A subframe is arbitrarily passed on. The net result of RDT processing according to the present invention is that a stream of 128 kbps is passed on to acoustic processor 20.

Figure 4:
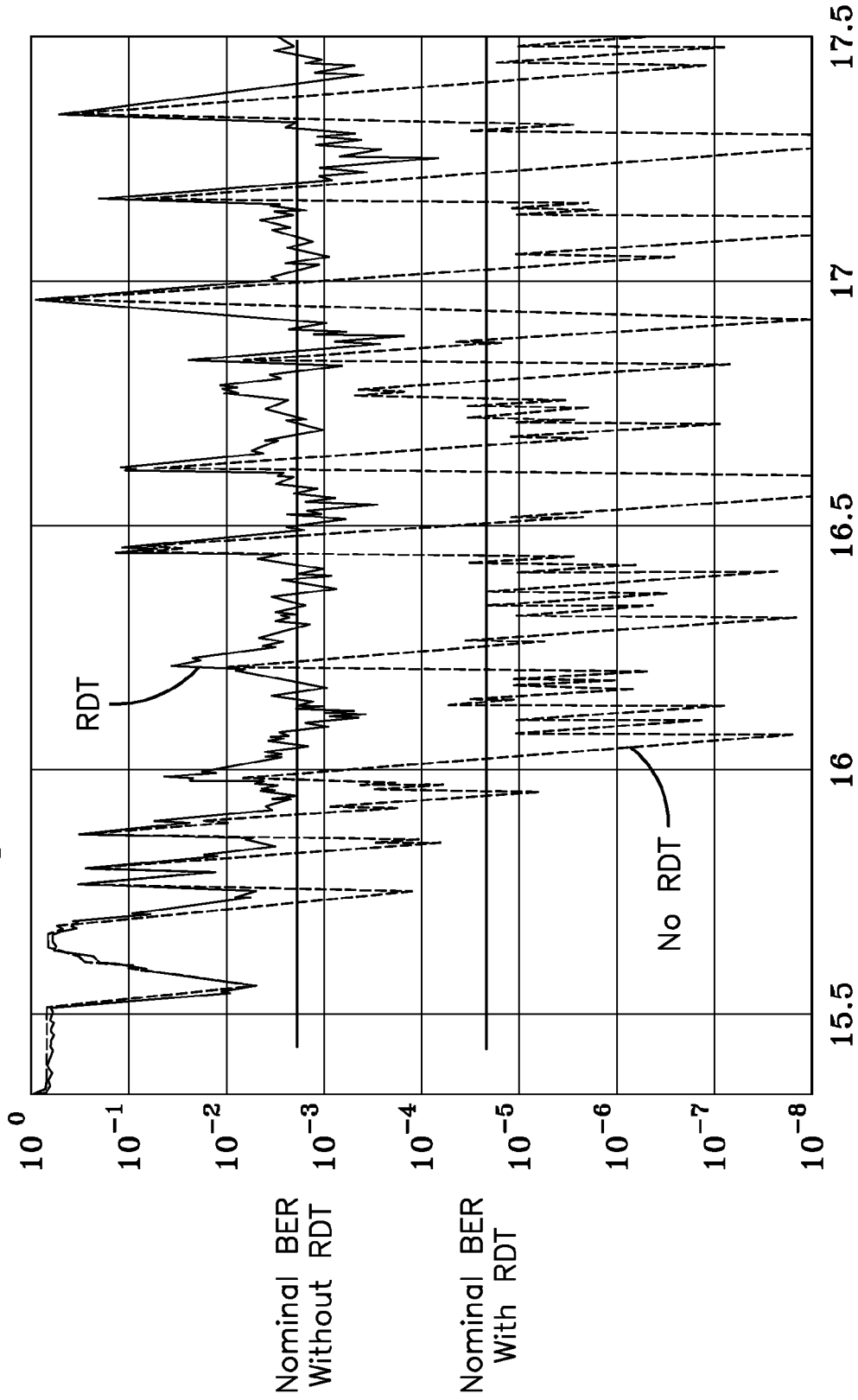
FIG. 4 is a graph depicting the BER performance of data received from a sonobuoy deployed in littoral waters in the presence of RFI compared with the BER performance of a representative acoustic sonobuoy receiver system in which data has been RDT transmitted and received in an embodiment according to the present invention
Figure 4:
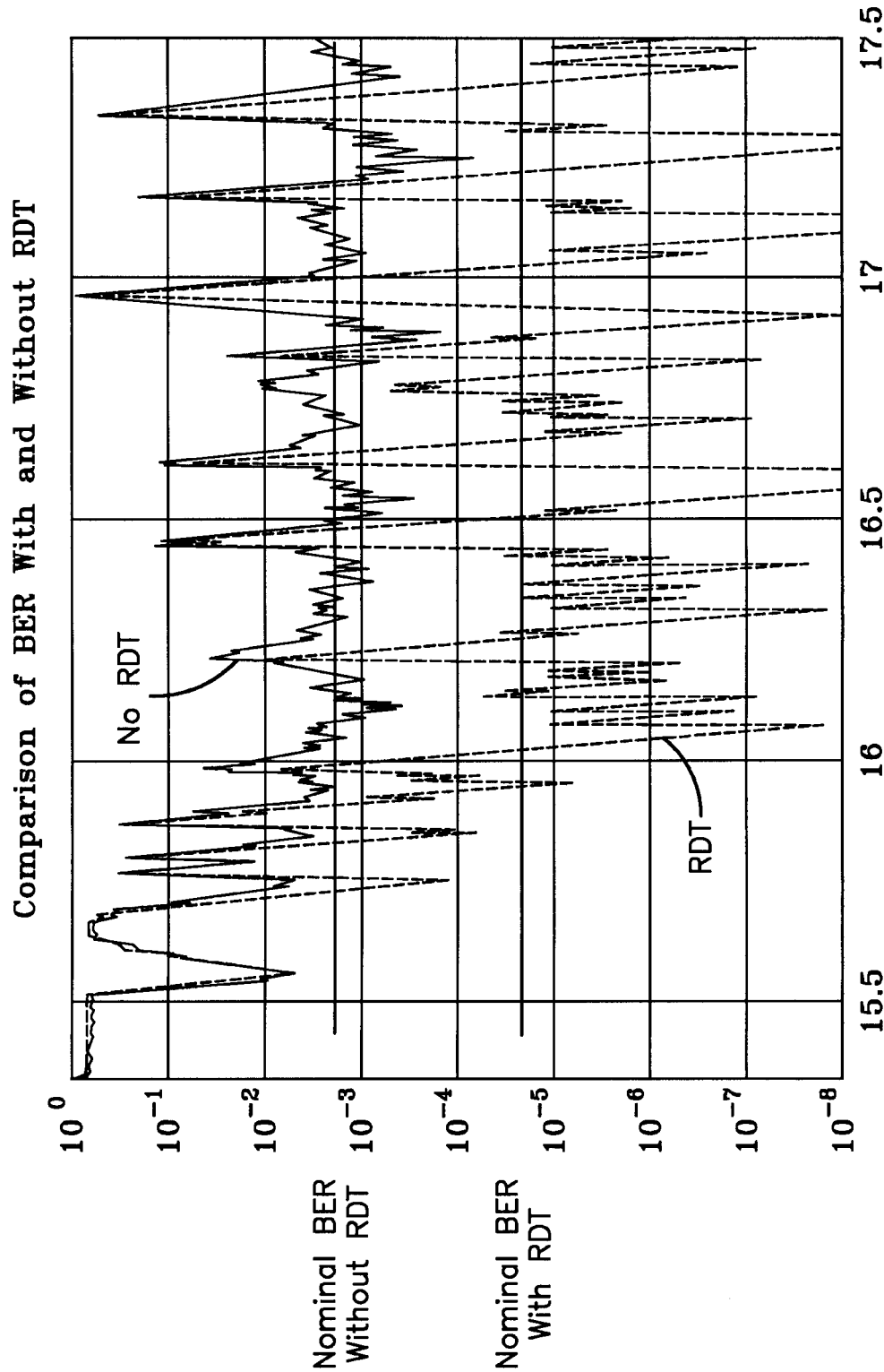

FIG. 4 is a graph depicting the BER performance of data received from an actual sonobuoy deployed in littoral waters in the presence of RFI compared with the BER performance of the same sonobuoy system in which data has been RDT processed in an embodiment according to the present invention. As can be seen, RDT processing substantially improves BER performance and does so using legacy sonobuoy receiver hardware without the need for costly new or additional hardware.

CONCLUSION

As has been shown, embodiments according to the present invention employ a redundant data transmission (RDT) technique to overcome RFI and signal propagation problems with a minimum of complexity and in a system that is transparent to legacy sonobuoy receivers. The method is elegant, simple, highly effective and designed to be fully operable within the limited capabilities of legacy sonobuoy receivers. While the method is particularly suited to use with such legacy sonobuoy receivers, it may also be used with new sonobuoy receivers. Accordingly, the scope of the invention should be determined by the following claims and their legal equivalents.

What is claimed is:

1. A method for improving bit error rate in digital transmissions of sonobuoy sensor data from a sonobuoy to a receiver platform, comprising:
    computing a send checksum on a frame of sonobuoy sensor data;
    copying the frame of data and checksum into a plurality of subframes;
    delaying one of the plurality of subframes for a predetermined period;
    multiplexing the delayed subframe with the plurality of subframes into a transmit frame; and
    transmitting the transmit frame.

2. The method according to claim 1 wherein the predetermined period is selected to be longer than an expected duration of an ocean wave period.

3. The method according to claim 1 wherein the predetermined period is approximately 1.6 seconds.

4. The method according to claim 1 wherein the transmit frame is capable of being received and demodulated by a legacy sonobuoy receiver.

5. The method according to claim 1 wherein the transmit frame is broadcast via a radio frequency signal.

6. The method according to claim 1, further comprising:
    receiving the transmit frame at a legacy sonobuoy receiver;
    demultiplexing the transmit frame into a plurality of subframes;
    computing received checksums for the plurality of subframes; and
    comparing the received checksums with the send checksum to determine whether data in either or both subframes is corrupt.

7. A method for improving bit error rate in digital transmissions of sonobuoy sensor data from a sonobuoy to a receiver platform, comprising:
    computing a send checksum on a frame of sonobuoy sensor data;
    copying the frame of data and checksum into a plurality of subframes;
    delaying one of the plurality of subframes for a predetermined period selected to be longer than an expected duration of an ocean wave period;
    multiplexing the delayed subframe with the plurality of subframes into a transmit frame;
    transmitting the transmit frame;
    receiving the transmit frame at a legacy sonobuoy receiver;
    demultiplexing the transmit frame into a plurality of subframes;
    computing received checksums for the plurality of subframes; and
    comparing the received checksums with the send checksum to determine whether data in either or both subframes is corrupt.

* * * * *

UNITED STATES PATENT AND TRADEMARK OFFICE
CERTIFICATE OF CORRECTION

| | | |
|---|---|---|
| PATENT NO. | : 7,986,585 B2 | Page 1 of 2 |
| APPLICATION NO. | : 12/261457 | |
| DATED | : July 26, 2011 | |
| INVENTOR(S) | : Donato M. Russo and Ronald Buratti | |

It is certified that error appears in the above-identified patent and that said Letters Patent is hereby corrected as shown below:

IN THE DRAWINGS:

Delete FIG. 4 and replace with the attached FIG. 4.

Signed and Sealed this
Fourth Day of October, 2011

David J. Kappos
*Director of the United States Patent and Trademark Office*